United States Patent
Chollet et al.

(10) Patent No.: US 7,083,732 B1
(45) Date of Patent: Aug. 1, 2006

(54) METHOD AND INSTALLATION FOR REMOVAL OF METAL CATIONS FROM A LIQUID BY RESINS WITH POLYAZACYCLOALKANES GRAFTED ON A SUPPORT

(75) Inventors: Hervé Chollet, Dijon (FR); Jean-Louis Babou, Fontaine les Dijon (FR); Frédéric Barbette, Vaux sous Aubigny (FR); Roger Guilard, Fontaine les Dijon (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 413 days.

(21) Appl. No.: 10/069,565

(22) PCT Filed: Aug. 25, 2000

(86) PCT No.: PCT/FR00/02374

§ 371 (c)(1),
(2), (4) Date: Feb. 27, 2002

(87) PCT Pub. No.: WO01/15806

PCT Pub. Date: Mar. 8, 2001

(30) Foreign Application Priority Data

Aug. 27, 1999 (FR) .................................. 99 10861

(51) Int. Cl.
*C02F 1/28* (2006.01)
*C02F 1/42* (2006.01)

(52) U.S. Cl. .................... 210/670; 210/678; 210/679; 210/681; 210/682; 210/687; 210/688; 210/911; 210/912; 210/913; 210/914

(58) Field of Classification Search ................ 210/670, 210/678, 679, 681, 682, 687, 688, 263, 269, 210/284, 912–914, 911
See application file for complete search history.

(56) References Cited

U.S. PATENT DOCUMENTS

| 3,985,648 | A | * | 10/1976 | Casolo ........................ 210/669 |
| 4,931,553 | A | * | 6/1990 | Gill et al. ................ 424/78.26 |
| 4,943,375 | A | | 7/1990 | Bradshaw et al. .......... 210/674 |
| 5,891,574 | A | | 4/1999 | Guilard et al. .............. 428/404 |

FOREIGN PATENT DOCUMENTS

| DE | 40 21 046 | 3/1991 |
| EP | 0 347 315 | 12/1989 |
| EP | 0 433 175 | 6/1991 |
| FR | 2 613 718 | 10/1988 |
| FR | 2 643 370 | 8/1990 |

(Continued)

OTHER PUBLICATIONS

Kirk-Othmer, Encyclopedia of Chemical Technology, Third Edition, vol. 20, pp. 773-775, "Silica (Amorphous)", 1982.

(Continued)

*Primary Examiner*—Ivars C. Cintins
(74) *Attorney, Agent, or Firm*—Oblon, Spivak, McClelland, Maier & Neustadt, P.C.

(57) ABSTRACT

The invention is related to a method and an installation for removal of metal cations contained in a liquid, in which said liquid is brought into contact at a temperature greater than or equal to 60° C. with a chelating ion exchange resin formed from a polyazacycloalkane grafted on a solid support, said resin having been conditioned, previously to said contacting, at a pH of 4 to 6.

44 Claims, 5 Drawing Sheets

FOREIGN PATENT DOCUMENTS

| | | |
|---|---|---|
| FR | 2 725 552 | 4/1996 |
| WO | 96 11056 | 4/1996 |
| WO | WO 96/11056 | 4/2002 |

OTHER PUBLICATIONS

M.-R. Spirlet, et al., Inorganic Chemistry, vol. 23, No. 3, pp. 359-363, "Crystal and Molecular Structure of Sodium Aquo(1,4,7,10-Tetraazacyclododecane-1,4,10-Tetraacetato)Europate(III) Tetrahydrate, $Na^+(EuDOTA-H_2O)^-·4H_2O$, and its Relevance to NMR Studies of the Conformational Behavior of the Lanthanide Complexes Formed by the Macrocyclic Ligand DOTA", 1984.

J.-P. Dubost, et al., Comptes Rendus de L'Academie des Sciences, serie II, pp. 349-354, "Structure D'un Agent De Contraste Utilise En Imagerie De Resonance Magnetique Le Complexe DOTA Gd $C_{16}H_{24}N_4O_8NaGd$, $5H_2O$", 1991.

* cited by examiner

METHOD AND INSTALLATION FOR REMOVAL OF METAL CATIONS FROM A LIQUID BY RESINS WITH POLYAZACYCLOALKANES GRAFTED ON A SUPPORT

The invention concerns a method and an installation for removal of metal cations from a liquid using chelating ion exchange resins formed from a polyazacycloalkane grafted on a support.

Said metal cations may be heavy metals, such as copper, zinc, tantalum or gold and are more particularly cations of radioactive elements from the actinide or lanthanide family and thus the present invention is applied, more particularly, to the total decontamination of alpha contaminated aqueous effluents.

In order to strictly limit the production of nuclear wastes and to preserve the environment, the effluents from factories for retreating spent fuel as well as the effluents from nuclear research centres must respect the discharge standards related to liquid effluents which are more and more severe.

Thus, for example, the CEA centre (ATOMIC ENERGY COMMISSION) of VALDUC must respect the following discharge standards where they concern the liquid effluents:

The activity of the effluent must be zero; the limits of detection of radiological analysis techniques being 2 Bq/m3.

Discharges in liquid form are prohibited, only the evaporation of effluents may therefore be considered.

The current treatment cycle of effluents from the VALDUC centre includes several steps according to the level of radiological activity of the effluents. Effluents with high radioactivity are distinguished from effluents with low radioactivity. According to its activity each effluent will return to a different treatment place.

The effluents with high activity undergo a precipitation-flocculation reaction that is followed by a filtration. The filtration sludge is sent to storage, while part of the filtrates in which the load of salts is greater than 80 kg/m3 is "overconcentrated". The distillates obtained by carrying out this "overconcentration" will return to the treatment cycle of effluents with low radioactivity, while the "overconcentrates" are stored. The filtration sludge and "overconcentrates" are coated with concrete and discharged for final storage.

Effluents with low activity as well as filtrates for which the charge of salts is less than 80 kg/m3 and the distillates derived from effluents with high activity will undergo evaporation under reduced pressure in an industrial evaporator, that is, a plate column in which distillation is carried out under reduced pressure. As a result of this technique, stripping effluents with low α contamination is successful, that is, for example for the CEA centre (ATOMIC ENERGY COMMISSION) of VALDUC, effluents having a contamination less than $1.5 \times 10^7$ Bq/m3 in α elements and less than 50 g/L in saline load.

At the end of the evaporation, on the one hand, there is obtained a concentrate containing almost all the α activity and a saline load on the order of 300 g/L. This concentrate is mixed with effluents with high activity on the storage site, in order to be later treated and packaged, for example in concrete. On the other hand, evaporates are obtained that form 90% of the aqueous phase of the effluents treated, up to an activity of 300 to 500 Bq/m3 and which must undergo a later treatment of microfiltration to decrease the residual activity below discharge standards indicated above: namely, zero activity and prohibition of liquid discharges. If these standards are not respected, then the effluents involved are reinjected into the treatment cycle.

The last decontamination, done by microfiltration, causes wastes and does not allow all the radioactive elements to be treated in a single step, in fact, this technique only separates the solid particles and does not enable the removal of metals present in the soluble fraction of the effluent.

It would therefore be worthwhile to have at one's disposal a procedure enabling the last decontamination at the end of the evaporation step, that is, the treatment of evaporates derived from the industrial evaporation tower with a view to removing the last traces of α-emitting elements, this method not presenting the drawbacks of the treatment by microfiltration.

Moreover, it would also be worthwhile to perfect a method allowing treatment of the effluents upstream of the industrial evaporator. In fact, the evaporation treatment does not allow a zero activity to be reached directly, which definitely requires the last treatment described above, and this evaporation technique is awkward to use and relatively costly in energy. It would therefore be useful to possibly replace the evaporation tower, while obtaining effluents in which the activity conforms to the above standards.

The extraction of heavy metals, actinides and especially uranium, plutonium and americium gave rise to a large amount of research. "Crown ether" derivatives that are not soluble in water and fixed on silica have been used in extraction methods especially for extracting lead, see for example the patent U.S. Pat. No. 4,943,375. Likewise, these crown ether derivatives have also been used in the absorption method on resin, see for example the patent application EP-A-0 433 175. This method allows recovery of part of the plutonium from concentrated solutions of fission products or of effluents from retreatment installations. However, such a method does not make it possible to attain sought values of the discharge standards.

In order to remedy this problem, the document FR-A-2 725 552 proposes a partial α-decontamination method of an aqueous effluent containing at least one polluting element chosen from copper, zinc, tantalum, gold, the actinides or the lanthanide. This method consists of bringing said effluent into contact with a silica gel and of separating said decontaminated gaseous effluent and the silica gel that has fixed at least one of said polluting elements; the effluent to be treated having a pH greater than or equal to 3.

This method makes it possible to carry out effective decontamination of the polluting elements, but only very partial. Very few instructions related to the operating method are given, especially where it concerns possible prior conditioning of the resin.

Recourse to complexing agents and also a worthwhile route for providing a last decontamination treatment solution of effluents with low radioactivity derived from evaporation towers and/or for replacing these towers.

From the prior art macrocyclic compounds are already known that have excellent complexing properties with respect to cations, anions or even neutral molecules. Thus, the document FR-2 643 370 describes derivatives with the following general formula:

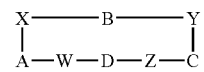

in which A, B, C and D may represent —(CH2)x-, x being between 1 and W, X, Y and Z may represent =N—(CH2)y-COR, y being between 1 and 4 and R representing OH, NH2 or OR' group. These derivatives may be used as complexing agents for metal elements and in complexed form as oxygen traps.

However, these macrocyclic derivatives are generally very soluble in water. Because of this, the use, the recovery and the regeneration of these derivatives in solution are not very easy. For these reasons, several modes of fixation have been developed for grafting these macrocyclic derivatives on organic or inorganic supports that are not soluble in water. Thus, the patent U.S. Pat. No. 4,943,375 reveals a macrocycle grafted on silica, usable in a separation column for trapping a given ion present in a solution of several ions.

The patent application FR-2 613 718 describes cyclic tetramines grafted on a polymer and likely to be used for selective extraction and/or measuring ions of transition metals and heavy metals. However, these grafted macrocycles present the drawback of not being selective for a particular type of metals.

In the nuclear field, the patent application EP-0 347 315 describes a method for separating, by means of crown ethers, uranium and plutonium present in an aqueous medium originating from the retreatment of spent nuclear fuels. The crown ether may be DCH 18C6, DCH 24C8 or DB 18C6.

Finally, the document WO-A-96 11056 concerns substituted polyazacycloalkanes grafted on a support such as silica and their use for the removal of metal cations from a liquid, in particular cations of transition metals, heavy metals, metals from Group IIIa, lanthanides or actinides.

However, the decontamination obtained by the method of this document using such complexing agents is still insufficient and did not satisfy the standards mentioned above, and in particular, does not allow the elimination of the last microfiltration.

It is evident from the preceding that there is an unsatisfied need for a method and an installation bringing complexing agents into play that are less expensive and effective, that especially allow the treatment of evaporates from industrial evaporation towers, in order to totally remove the last traces of α-emitting elements and/or that ensures the treatment of effluents upstream of the industrial evaporation tower, in order to be able to replace this tower while obtaining effluents presenting activities in conformance with the discharge standards given above.

A need still exists for a method that entirely fulfils these requirements, in terms of decontamination, in a limited number of steps, without involving a final treatment, for example by microfiltration.

The goal of the present invention is to provide a method and an installation for removal of metal cations from a fluid, more precisely, a decontamination method that satisfies the needs given above.

The goal of the present invention is, in addition, to provide a method and a device for removal of metal cations from a fluid that does not present the drawbacks, limitations, defects and disadvantages of methods and devices of the prior art and which solves the problems of the prior art.

This goal and others are reached still in conformance with the present invention by a method of removal of metal cations contained in a liquid, in which said liquid is brought into contact at a temperature higher than or equal to 60° C. with a chelating ion exchange resin formed from polyazacycloalkane grafted on a solid support, said resin having been conditioned, previously to said contacting, at a pH of 4 to 6.

According to the invention, it has been noted surprisingly, that the fact of performing the contacting in the specific range of temperatures given above, and in addition, of carrying out said contacting after having previously conditioned said resin at a specific pH, made it possible to obtain considerably improved fixation capacities and selectivity with respect to actinides.

Among the numerous parameters controlling the process of fixation of cations and influencing the capacity of the resins, it did not clearly follow that it was definitely the contacting temperature, as well as the conditioning pH that has a decisive influence on their capacity.

This note goes counter to what is currently accepted in this field of the technique where it is known that such conditioning has only little or no effect on the conventional silica gels or resins of the AMBERLITE® type.

In addition, it was even less predictable that the fact of being placed in specific ranges of these two specific parameters would lead to a surprising improvement of the capacity of the resins. This capacity being, in addition, combined with a very great selectivity especially with respect to the actinides.

In other words, the invention originates from a selection of two parameters among infinity of parameters, then with the selection of narrow ranges of values of these two parameters and finally with the combination of these specific ranges of these specific parameters.

It is to be noted that this conditioning pH must not be confused with the pH at which the contacting is carried out, in fact, the method according to the invention enables liquids to be treated in a wide range of pH values, as much acid or very acid as basic or very basic, independent of the range of specific pH values at which the conditioning takes place. In other words, even if the conditioning is carried out in the above range of pH values, such conditioning does not limit the treatment to liquids with specific pH values, for example, one could by the method of the invention treat all types of effluents having a pH from 5 to 9 such as effluents at pH 7 from the evaporation tower.

Preferably, according to the invention, the contacting is carried out at a temperature going from 60° C. to a temperature lower than the boiling temperature of the liquid at the pressure prevailing during contacting, preferably still the contacting is carried out at a temperature of 60 to 80° C. and the pH of the conditioning of the resin is 4 to 5, for these ranges the best capacity and selectivity is obtained.

The conditioning (or reconditioning) of the resin is generally carried out by contacting said resin with a buffer solution, for example, an aqueous buffer solution in which the pH is located in the range mentioned above, for example 4.7. By way of example of buffer solution, a buffer of the acetic acid-sodium acetate type may be mentioned; this contacting with the buffer solution may be possibly preceded and/or followed by a rinsing of the resin with the main solvent of the liquid to be treated, for example with distilled water.

Advantageously, according to the invention, the method is carried out continuously, said resin being placed in at least one column through which passes a current of the liquid to be treated.

The method according to the invention may use 1 to several, for example 5 or 10 resin columns.

The use of resins in columns makes the method according to the invention easy to use, effective and not very expensive.

The conditioning of the resin is then done simply by making a buffer solution pass through the column in the direction of circulation of the liquid to be treated (in general, from the bottom to the top).

In addition and preferably, the method according to the invention comprises a regeneration step of said resin when the latter is saturated with the fixed metals in order to recover the latter.

Preferably, said regeneration is carried out by making liquid to be treated by a regeneration solution pass through the column(s) in the reverse direction (in general from top to bottom) of the circulation direction (in general from bottom to top).

Preferably, this regeneration solution is chosen from the acid solutions with pH values from 1 to 3, for example a pH in the region of 2, for example, solutions of nitric acid, with for example a concentration of 1 to 3 mol/L.

Said regeneration solution containing the metals initially fixed on the resin may be then treated, at the end of the regeneration step to recover the metals which may have a high added value.

This treatment of the regeneration solution may for example be that described previously for said effluents with high activity.

The regeneration capacity of resins mentioned above had most certainly already been demonstrated in static mode, it is however surprising that a high regeneration capacity could also be obtained in dynamic mode. This regeneration capacity makes it possible to use the resins in an industrial decontamination method in which it is necessary to be able to recover the metals fixed on the resin in order to reuse the materials several times in succession.

Because the resins used in the method according to the invention are easily regenerated, the reconditioning of a significant amount of wastes is however avoided.

According to the invention and preferably, the method of removal comprises a step prior to treatment of the liquid by contacting with a known ion exchanger chosen from the chelating resins on the market such as resins of the polyacrylate type, such as resins known under the name of AMBERLITE®, for example, or a known organic or mineral adsorbent for example, silica, preferably, this adsorbent is chosen from silica gels, such as KIESELGEL® (MERCK®).

Such a treatment is approximately similar to the treatment described in the document FR-A-2 725 552 and the absorbents used are generally similar to those described in this document.

Such a treatment makes it possible to increase the effectiveness of the separation with respect to certain metals such as the alkaline-earth metals and the transition metals. It makes possible a partial purification of the liquid and a prefiltration of the liquid and a less rapid saturation of the polyazacycloalkane resin fixed on a support. Preferably this prior treatment is also carried out continuously said ion exchanger or said adsorbent being placed in at least one column through which passes a current of liquid to be treated and positioned upstream of said column filled with resin.

In the same way as the resin, in addition, this ion exchanger or this adsorbent may be also regenerated when it is saturated by the fixed metals. Preferably, this regeneration takes place under the same conditions as the regeneration of the resin and at the same time as the latter and with the same regeneration solution.

Said metal cations to be removed that are contained in the fluid are preferably metal cations chosen from transition metals, heavy metals, metals from group IIIA of the periodic table, lanthanides, actinides, alkaline-earth metals. Just in the configuration with (at least) two columns, the heavy metals and the lanthanides and actinides are fixed selectively by the second column and the alkalis and alkaline earths by the first column which preserves the second resin column.

In particular these cations are chosen among the cations of U, Pu, Am, Ce, Eu, Al, Gd, Cr, Mn, Fe, Co, Ni, Cu, Zn, Ag, Cd, B, Au, Hg, Pb, As, Ca, Sr, Mg, Be, Ba and Ra.

The liquid treated by the method of the invention may be any one but it preferably concerns an aqueous liquid. This liquid may be an industrial effluent, urban or another, it is preferably a radioactive effluent, for example an α-contaminated effluent, preferably with low activity, in which said cations are cations of radioelements.

This effluent, preferably aqueous, may be derived from a factory for retreatment of nuclear wastes, from a nuclear laboratory or any other installation, in which radioactive substances are used, preferably this effluent is the aqueous effluent with low activity derived from industrial evaporator of the treatment installation of effluents from a nuclear installation.

The method according to the invention may for the treatment of effluents with low activity, replace the existing step resorting to an industrial evaporator and to a last treatment by microfiltration because the method according to the invention makes it possible to purify directly all the effluents with low activity without another later treatment and to reach zero activity. Or else the method according to the invention may take place downstream of the evaporation step bringing into play an industrial evaporator for carrying out a last decontamination in a single step, and replacing the microfiltration step by ensuring the removal of metals present in the soluble fraction of the effluents.

Said liquid may also be a biological fluid, such as blood, in which case the cations removed will be copper or aluminium, for example.

It is to be noted that the nature of the resin used may be adapted according to the cation(s) that are desired to be retained and according to the effluent.

The chelating ion exchange resin used in the method of the invention and formed from polyazacycloalkane grafted on a support are described for the most part in the document WO-A-96 11056 and fulfil one of the three formulas (I), (II) and (III) below:

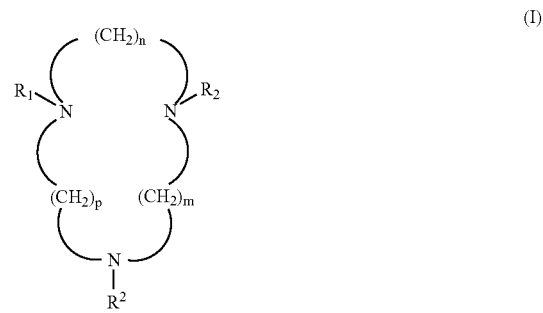

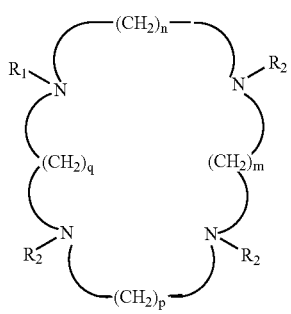 (II)

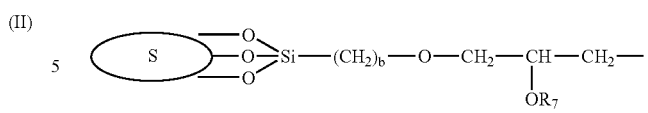

or the formula:

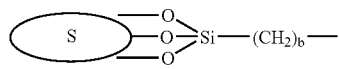

S representing a silica gel, b being between 1 and 4 and preferably equal to 3 and $R_7$ being an alkyl group or a hydrogen atom.

Residue of an organic polymer that may or may not be crosslinked with alkyl halide end is understood to be a polymer in which the halogen(s) is (are) entirely or partially substituted.

Preferably, the grain size distribution of the chloromethyl polystyrene and that of the solid support derived from silica are between 20 and 400 mesh or better between 20 and 70 mesh. It is the grain size distribution of the chloromethyl polystyrene and not the grain size distribution of the rest that may be different.

Preferably, according to the invention all the nitrogen atoms of the macrocycles are substituted by identical ester groups: acetates, propionate etc.

When all the nitrogen atoms of these different macrocycles are substituted by the same ester groups, such as acetate, propionate, the macrocycles present remarkable properties of complexing with metals of the lanthanide and actinide series and especially europium and gadolinium. X-ray analysis shows that the coordination of the metal atom with the macrocycle is carried out by oxygen atoms of the carboxylate groups when the nearby macrocycles described for example in the article by SPIRLET et al., Inorg. Chem., 1984, 359–363 or in the article by DUBOST et al., C. R. Acad. Sci., Paris Ser. 2, 1991, 312, 349–354, the metal atom is coordinated with nitrogen and oxygen atoms at the same time. This result is attributable to the nature of the groups carried on the nitrogen atoms of the macrocycles. Preferably, the macrocycles or all the substituents of nitrogen are ester groups such as propionate, acetate, are grafted on a silica gel.

Likewise, the nature of the support may be adapted according to the effluent treated: thus, when the solid support is silica gel, the product obtained is with reduced expense, surprisingly, easily regenerable by simple treatment of the acid, even in dynamic mode, stable in most organic solvents and inert with respect to numerous chemical products.

In addition, this product may be used under pressure, in combustive or oxidizing medium.

When the solid support is of the MERRIFIELD resin type (trademark filed) marketed by the ALDRICH Company the product obtained is physiologically inert and may be used as selective complexing agent for blood elements, for example for elimination of the cation $Cu^{2+}$ in a dialysis treatment.

In the remainder of the description, the names of the polyazacycloalkanes according to the invention are presented in abbreviated form for the purposes of simplification. More precisely, the polyazacycloalkanes with four

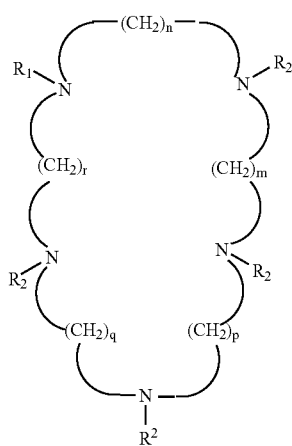 (III)

in which n, m, p, q, r which may the same or different are equal to 2 or 3, $R_1$ is a solid support, $R_2$ represents the hydrogen atom or the $(CH_2)_2$-$R_3$ group, $R_3$ being a functional group chosen from the group formed by COOH, $CONH_2$, $CH_2OH$, CN or $COOR_4$, $R_4$ representing an alkyl or benzyl group, or $R_2$ represents the —$(CH_2)$-$R_5$ group, $R_5$ representing COOH or $PO_3R_6$, $R_6$ representing an alkyl group or hydrogen.

The silica gels S, such as used in the invention (and which may also be used in the prior treatment) are defined for example in KIRK-OTHMER, Encyclopaedia of Chemical Technology; 3rd edition, Vol. 20, p. 773–775.

The solid support may be an organic polymer that may or may not be crosslinked and in particular a residue of an organic polymer that may or may not be crosslinked, with alkyl halide or alkyl chloride end, such as a residue of chloromethyl polystyrene with the formula:

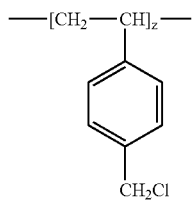

or may be a derivative of silica fulfilling formula:

nitrogen atoms are referenced with the form "R1, a series of figure, R2" and fulfilling the general formula:

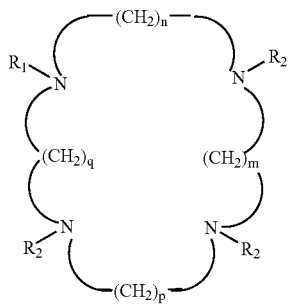
(II)

R1 representing the Si support, hydroxy or Me Si with "Si" signifying:

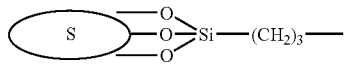

S=silica gel

"hydroxy Si" signifying:

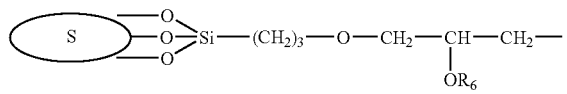

S=silica gel and "Me" signifying Merrifield resin with formula:

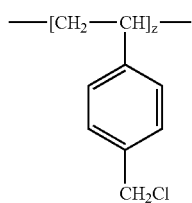

R2 representing TrP, TrA or TrMP with "TrP" signifying: (CH2)2-COOH

"TrA" signifying: CH2-COOH and "TrMP" signifying: CH2-PO3H

When no indication is specified for R2, that signifies that R2=H.

When the series of figures is 2222 or 3333 that signifies that n, m, p and q are all equal to 2 or 3, respectively. When the series of figure is 2323, that signifies that n and p are equal to 2 and m and q are equal to 3 or conversely, that n and p are equal to 3 and m and q are equal to 2.

The polyazacycloalkanes with 3 or 5 nitrogen atoms are referenced similarly. Thus, the series of figures 232 signifies that among n, m and p, two of these letters represent 2 and the other represents 3.

Thus, the preferred resins used in the method of the invention are the following resins:

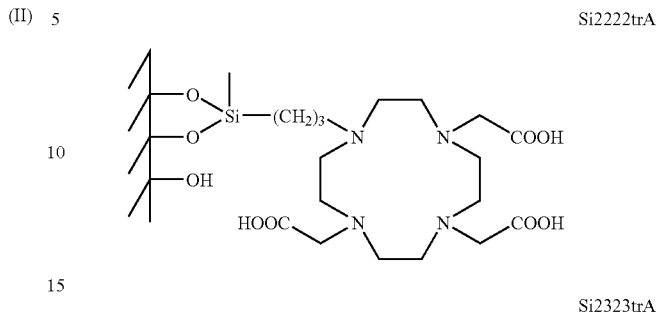
Si2222trA

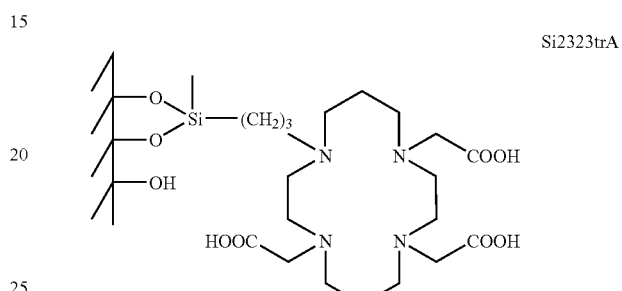
Si2323trA

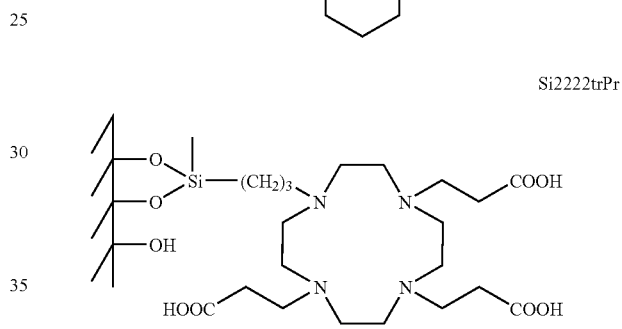
Si2222trPr

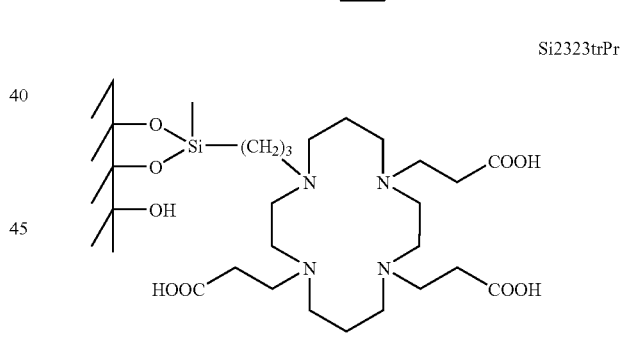
Si2323trPr

Si2323trPr is the preferred resin.

The resins used in the method according to the invention may be prepared by any appropriate method.

Thus, the resins used in the method according to the invention may be prepared by the method described in the document WO-A-96 11056 to which reference is made here fully and explicitly and for which the content is fully included in the present description.

The method described in this document consists of reacting the silica with a spacer arm, then for example with a polyazacycloalkane, such as a tetraazamacrocycle and to next carry out substitution of the free amine functions of the macrocycle (polyazacycloalkane) by groups especially including a carboxylic acid function.

The amount of macrocycle grafted, according to the synthesis scheme, is generally approximately 0.35 to 0.40 mmol.g of material. This first method that we will call for the remainder "pathway 1" has shown during its use that the synthesis steps could be incomplete.

In other words, this synthesis pathway 1 presents two major drawbacks: only 30 to 50% of the grafted spacer arms in the first step react with the macrocycle. The amount of macrocycles grafted is thus found to be considerably reduced and the residual presence of functions that have not reacted may prove to be detrimental during the use of a method, such as that of the present invention, using the materials for a given application.

cyclam or cyclene (and not the silica, as in the "pathway 1" method) with a spacer arm, then by grafting said compound carrying a spacer arm on the silica.

Possibly and preferably, said compound (polyazacycloalkane) carrying a spacer arm (compound A) is first functionalized prior to its grafting on the silica, that is, a macrocycle (polyazacycloalkane) is synthesized, tetrasubstituted for example, prior to grafting of the latter on the silica.

An example of the "pathway 2" method without prior functionalization of the compound carrying the spacer arm is given below, the starting compound being cyclam and the spacer arm fulfilling the formula:

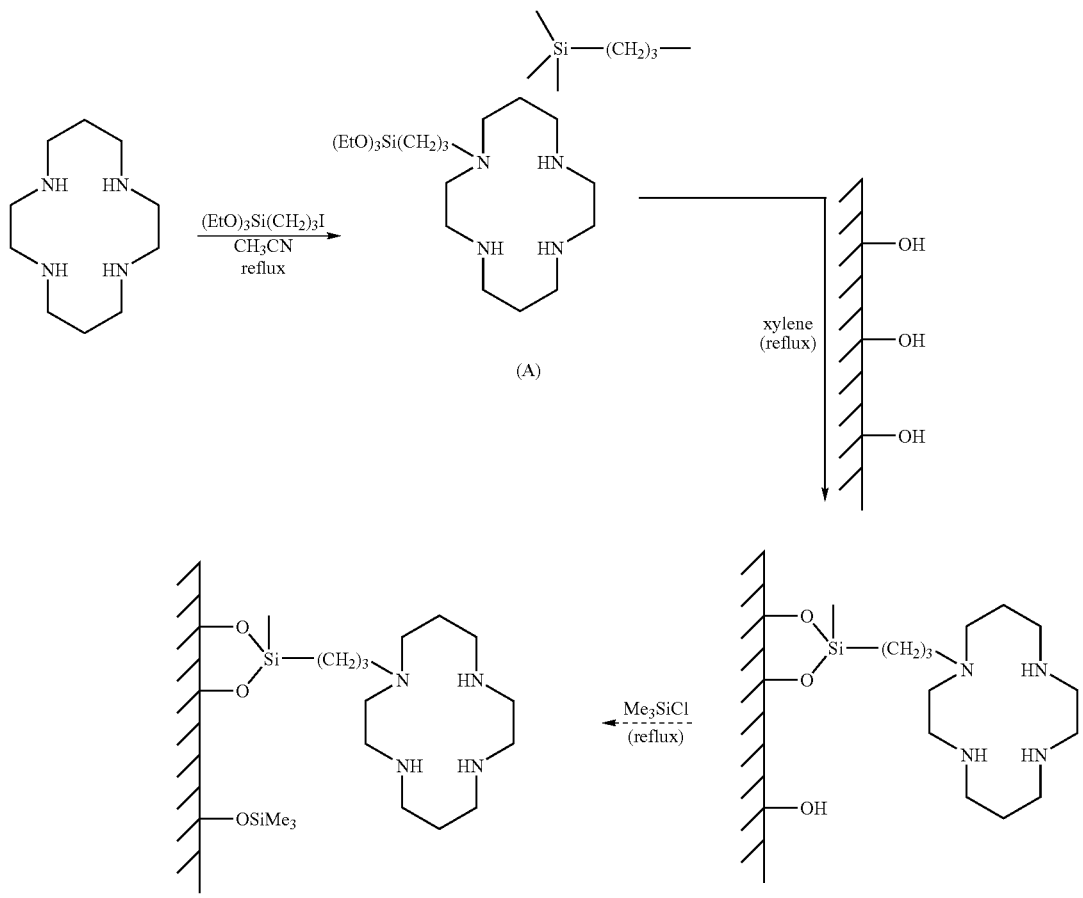

The N-functionalization of the macrocycle for example, of the grafted tetraazamacrocycle, last step of the synthesis, is not quantitative because only one to two secondary amine functions out of an available three react with the reagent.

In addition, it is not excluded that certain macrocycles may be connected by two atoms of nitrogen to the silica gel. This heterogeneity greatly harms the effectiveness and the selectivity of the modified silica gel.

That is the reason for which another method of grafting is proposed for the preparation of resins used in the method of the invention.

This method, called "pathway 2" method, differs essentially from the "pathway 1" method because the order of each of the grafting steps is changed, by first reacting a macrocycle, unsubstituted polyazacycloalkane such as In the reaction scheme, the last step (stippled arrow) is optional; it enables free silanol groups remaining on the silica to be protected.

Iosdopropyltriethoxysilane is synthesized simply by the action of NaI on commercial chloropropyltriethoxysilane. Iodopropyltriethoxysilane in solution in acetonitrile is then added drop by drop to a solution of cyclam in acetonitrile at reflux in the presence of Na2CO3. The reaction mixture is kept at reflux for 24 h, the solvent is then evaporated and pentane is added to the residue. Excess insoluble cyclam is filtered, the filtrate is concentrated and the compound (A) is obtained without later purification with a yield of 50%. The grafting of (A) on the silica gel is carried out at reflux of xylene for 4 days. The amount of grafted macrocycles is then 0.8 mmol.g of modified silica gel, for example.

Compound (A) may possibly be functionalized, then grafted according to the scheme:

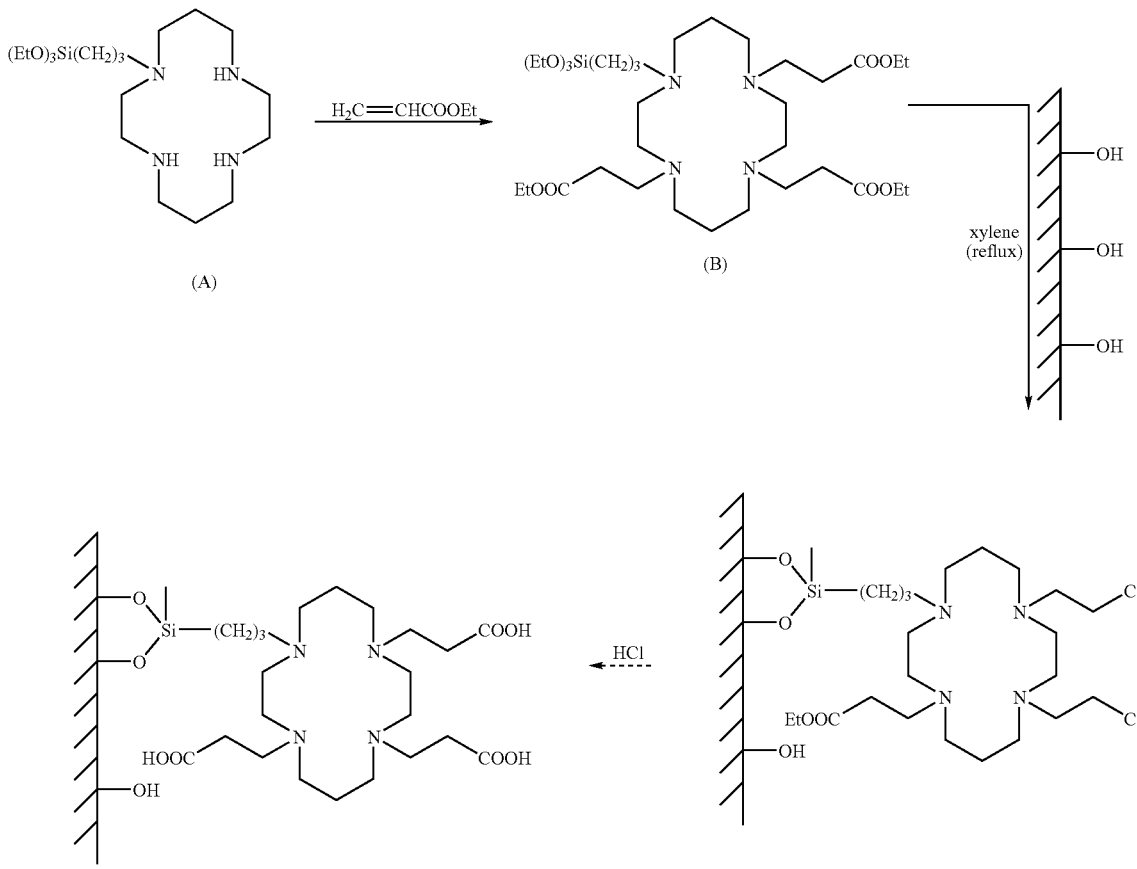

Compound A is agitated for 4 days at ambient temperature in ethyl acrylate. After evaporation of the ethyl acrylate and several washes with pentane, product B is obtained quantitatively. Grafting of B on the silica gel is then carried out as described above. The final compound is the resin "Si2323trPr" according to nomenclature used in the present application.

The last reaction step with HCl is however optional, the preceding compound with three ester functions also being likely to be used in the method according to the invention.

It is very obvious that the method described above may be applied to any known unsubstituted starting macrocycle with any spacer arm, on any support including active sites, silanols or another an that the functionalization reaction may be any reaction known to the person skilled in the field.

Thus, different spacer arms (containing aromatic units, ester or amide functions) may be used, likewise, the electrophilic reagent used during the N-functionalization may also vary, enabling access to a large range of silica gels presenting optimal effectiveness and selectivity.

If this method is compared to that proceeding by grafting the spacer group on the silica gel, then by fixation of the desired ligand on this arm, this new method generally makes it possible to double the amount of tetraazamacrocycles grafted on the surface of the silica gel. Thus, there is a significant increase in the number of "active sites" per unit of surface area and considerable improvement in the effectiveness of the material following from it. The second advantage, even more important, is to be able to totally control the nature of the fixed ligand, since it is synthesized, isolated and characterized before grafting.

This new method of synthesis of ligands carrying spacer arms does not require any particular experimental conditions and leads to the expected compounds in suitable yields without later purification. In addition, this synthesis is carried out in a single step and not two as in the method where hydrosilylation of the terminal alkene takes place. Finally, the N-substitution of these ligands is quantitative and enables grafting of totally N-substituted macrocycles.

In other words, the "pathway 2" method has the advantage of being able to prepare and characterize the tetrasubstituted macrocycle by conventional techniques of organic chemistry. This grafting method makes it possible, on the one hand, to be certain that the grafted macrocycle is a good carrier, for example of three "carboxylic acid" arms, (these functions have a prime role in the complexing of actinides) and on the other hand, at least of doubling the amount of macrocycle grafted per unit of weight (see Table I).

Thus, the different amounts of macrocycles grafted for various resins have been determined by, elemental analysis. The results are brought together in Table I, which makes it clearly evident that the resins prepared by the method of "pathway 2" have an amount of grafted macrocycle clearly greater than that of the resins prepared by the "pathway 1" method.

TABLE I

Amounts of macrocycles grafted for the different modified silica gels

| Resin | Amount of macrocycles grafted (mmol.g−1) |
|---|---|
| Si2222trA | 0.24 |
| Si2323trA | 0.26 |
| Si2222trPr | 0.28 |
| Si2323trPr ("pathway 1") | 0.32 |
| Si2323trPr ("pathway 2") | 0.61 |

Generally, if the amount of polyazacycloalkane grafted per unit of weight of support, as a result of the methods of "pathways 1 and 2" is generally from 0.1 to several mmol.g-1, preferably this amount must be as high as possible.

The amount of polyazacycloalkane grafted per unit of weight obtained by the "pathway 2" method is in addition as given above, clearly greater than that of "pathway 1", it is therefore greater than 0.4 mmol.g-1, preferably greater than or equal to 0.6 mmol.g-1, still preferably greater than or equal to 0.8 mmol.g-1.

The "pathway 2" method is described in the French patent FR-A-2 774 092 (Application No. 98 00784) to which reference is made here fully and explicitly and for which the contents are fully included in the present description.

The invention has also dealt with the installation of use of the method according to the invention.

Such an installation for the removal of metal cations contained in a liquid essentially comprises at least one container such as a column filled or furnished with a chelating ion exchange resin formed from a polyazacycloalkane fixed on a support, means for causing a current of liquid to be treated to pass through said column, means for conditioning said resin at a pH of 4 to 6 and means for heating said resin to a temperature greater than or equal to 60° C.

In addition, the installation may include means for regenerating said resin.

Advantageously, in addition, the installation according to the invention comprises a container, such as a column filled with ion exchanger or organic or mineral adsorbent different from said polyazacycloalkane resin grafted on a support, placed upstream (relative to the direction of circulation of the current of liquid to be treated) of said column filled with resin.

The installation according to the invention will also comprise, in addition, preferably, means for regeneration of said ion exchanger or adsorbent.

Other characteristics and advantages of the invention will appear better with reading the description and following examples, give by way of illustration and not limiting.

This description is made in reference to the attached drawings in which.

Figure 4:
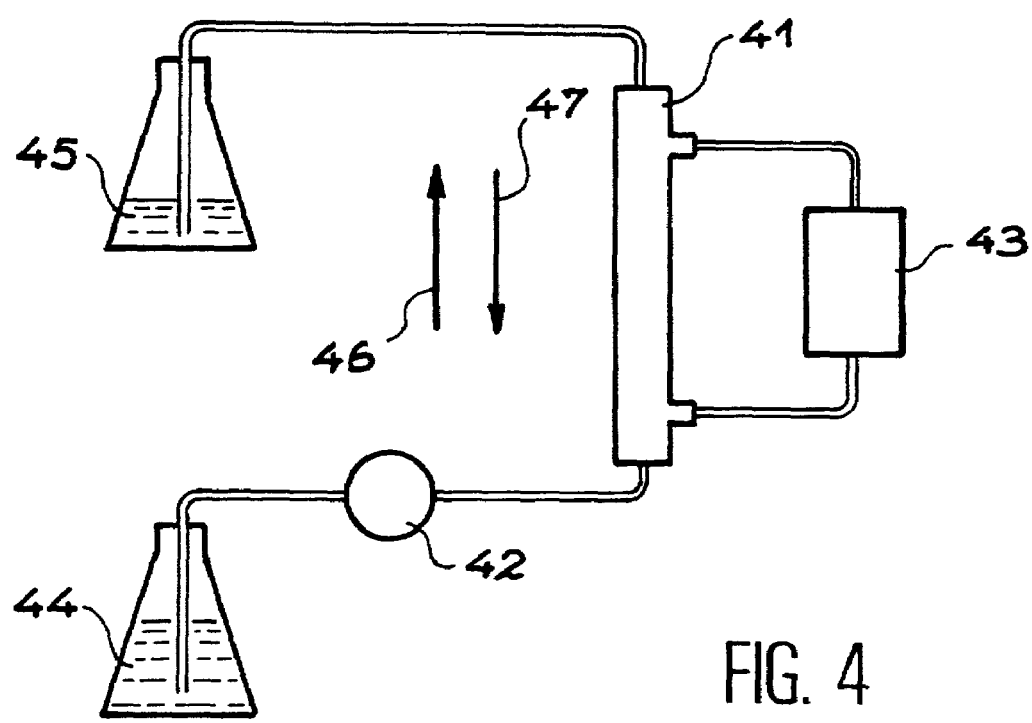
Figure 5:
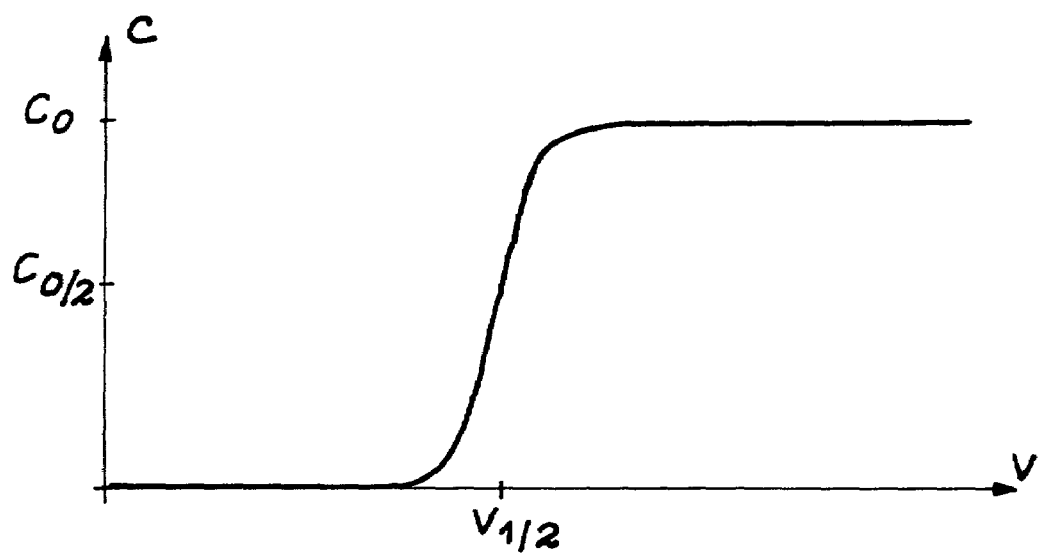
Figure 6:
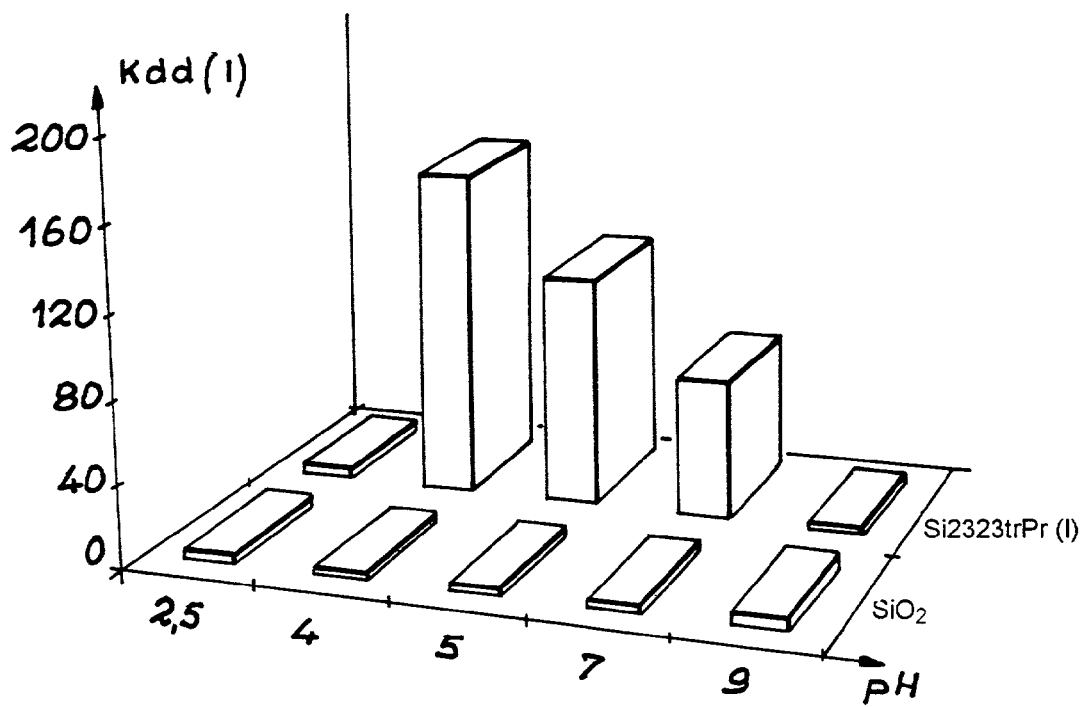
Figure 7:
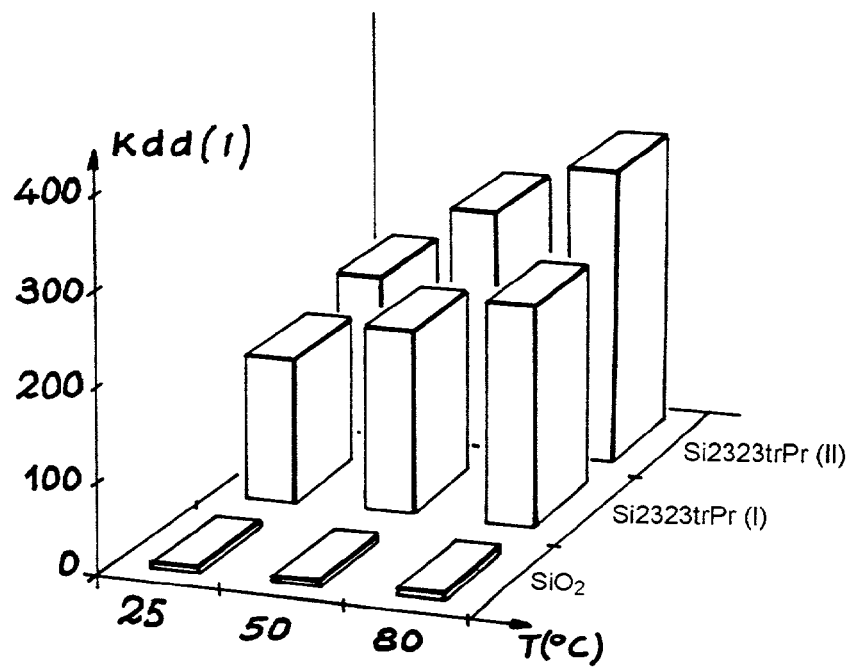
Figure 8:
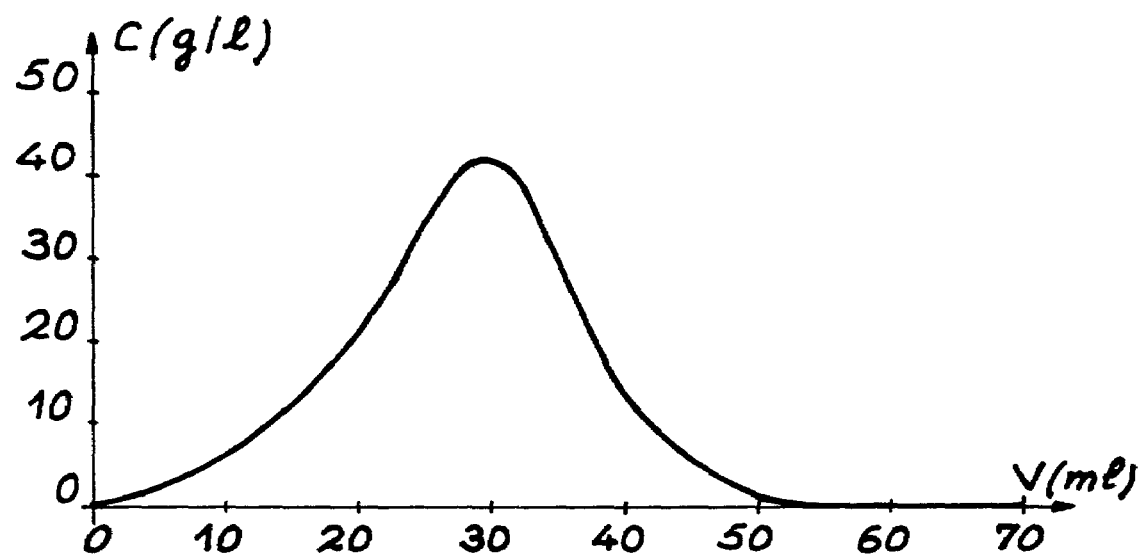

On the abscissa is shown the temperature T(° C.) and on the ordinate is shown the static partition coefficient Kds (mL/g), the curve with stippled lines is related to control silica gel and the curve with unbroken line is related to the Si2323trPr resin ("pathway 1");

FIG. 4 is a diagrammatic view in vertical section of the device used for the tests in dynamic mode;

FIG. 5 is a graph that gives the "type" profile of elution of uranium through a column filled with modified silica gel. On the ordinate, is shown the concentration C of uranium at the outlet of the column and on the abscissa is shown the volume of eluted solution V;

FIG. 6 is a graph that gives the dynamic partition coefficient Kdd (1) for the Si2323trPr resin ("pathway 1") (I) and for the control silica gel according to the pH (T=25° C., uncertainty ±10%);

FIG. 7 is a graph that gives the dynamic partition coefficient (Kdd) (1) for the resins, Si2323trPr ("pathway 1") (I) and Si2323trPr ("pathway 2") (II) at pH 4, and for the control silica gel at pH=9 according to the temperature T (° C.) (uncertainty ±10%);

FIG. 8 is a graph that represents the elution profile of uranium (VI) from a column filled with Si2323trPr ("pathway 2") with the aid of 2N nitric acid and at ambient temperature.

Figure 9:
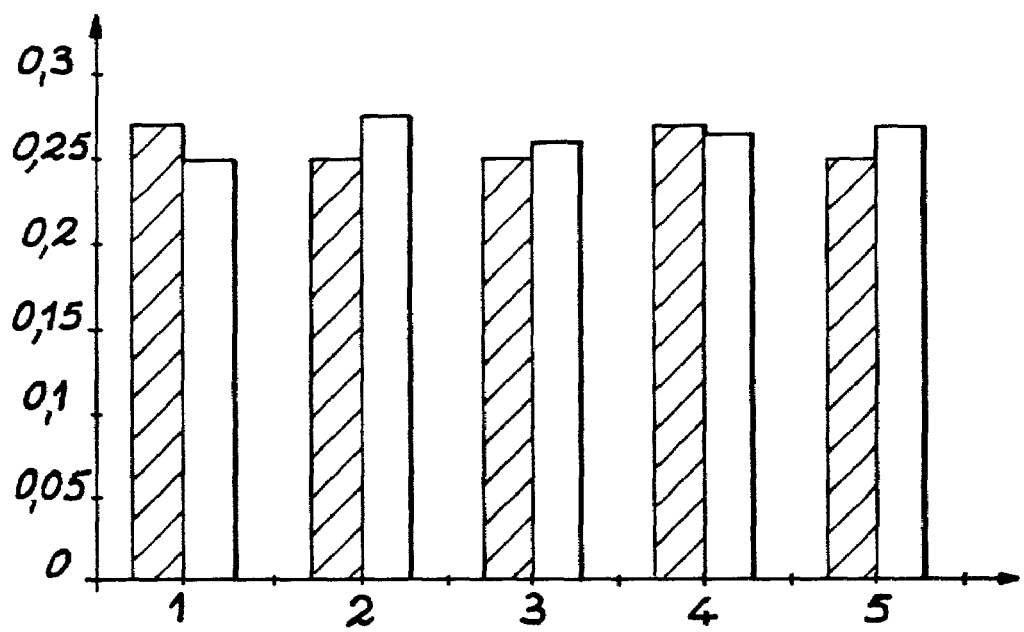

On the ordinate is shown the concentration of uranium C, in g/L, and on the abscissa is shown the volume of eluted HNO3 (V) in mL;

FIG. 9 is a graph that illustrates the amounts of uranium fixed (striped strips) and salted out (white strips) in mmol.g for 5 experiments carried out with the material Si2323trPr ("pathway 2") (uncertainties ±10%).

Figure 1:
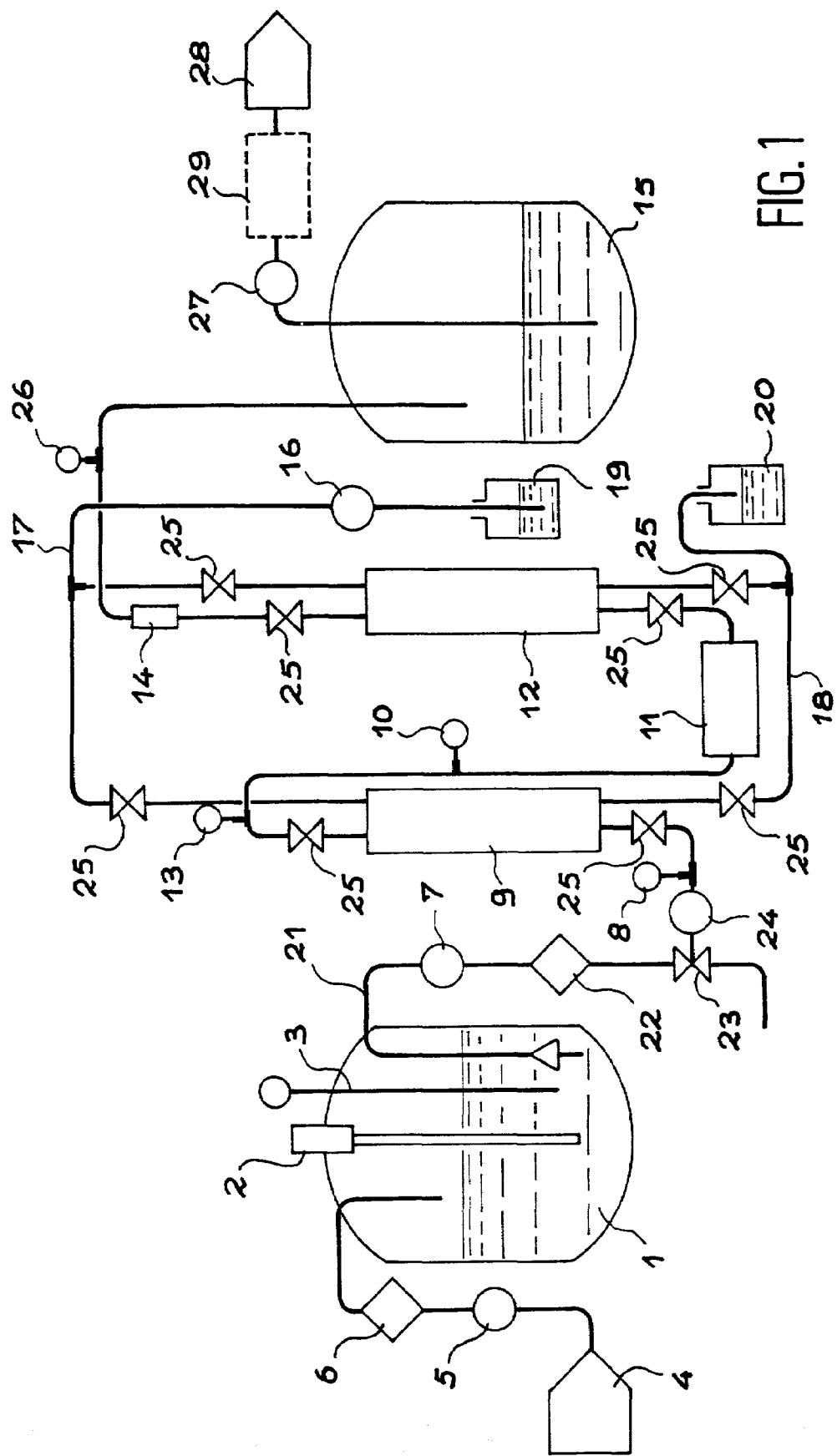
FIG. 1 is a diagrammatic view in vertical section of an installation for use of the method according to the invention, more particularly suiting treatment of effluents downstream of the industrial evaporator, comprising two columns filled, respectively, with silica and polyazacycloalkane resin fixed on silica.

FIG. 1 is a production example of an installation for use of the method according to the invention suiting more particularly treatment of effluents downstream of the industrial evaporator comprising two columns, the first filled with silica and the second filled with resin, polyazacycloalkane fixed on silica.

This example of installation according to the invention diagrammatically includes the following parts.

A tank (1) for receiving contaminated effluents with a volume for example of 1.5 m3 provided with sensors of tip and bottom levels, an immersion heater (2), a temperature probe (3) and an agitating system (not represented). Before receipt, the effluent is sent by a pump (5) through a filtering bowl (6) provided with cartridges for example with three cartridges with a pore diameter of 5 µm.

A decontamination circuit composed of a metering pump (7), a first manometer (8), a first column filled with silica (9) which is provided with electric band heaters with a system for control of the temperature, with a second manometer (10), with a reheater (11), with a second column filled, for example, with Si2323trPr resin (12), with a temperature probe (13) and a flow meter (14). Each column contains on the order of 12 L of resin. The entire pipe line is preferably stainless steel.

A tank for receiving treated effluents (15) provided with sensors of top and bottom levels.

An elution circuit composed of a peristaltic pump (16), a stainless steel pipe line (17, 18) and two canisters (19, 20).

In addition, the installation comprises on the piping connecting the tank (1) to the column (9) a filter (22), a solenoid valve (23) and metering pump (24). Moreover, manual valves (25) are provided between the inlets and the outlets of both columns (9) and (12). A temperature sensor (26) is placed on the piping feeding the tank for receiving treated effluents (15) and a pump (27) for sampling the effluents found in this tank for a discharge (28) after radiological analysis.

The entire installation is placed in a retention container provided with flood sensors. The heating systems, the different probes and the pumps are servo-driven with an electric panel.

The operation of the installation of FIG. 1 may be described in the following way:

Previously, the effluent to be treated, dispatched for example by water tank car, is carried along by the pump (5) through the filter with cartridges (6) in order to remove the impurities and solid particles (sludge, algae etc.). In fact, the extraction methods on the solid phase generally are very sensitive to fouling and must be protected upstream by a filtration system. The effluent "proper" is then admitted to the tank for receiving contaminated effluents (1).

The operation of the installation may be broken down into two phases:

1) Fixation: The effluents are carried along by the metering pump (7) successively through the two columns (from bottom to top) (9) and (12), filled, respectively, with silica and resins, for example Si2323trPr resin.

According to the invention, the temperature of the effluent during passage on the column of resin is preferably 60° C. The heating of the effluent is carried out simultaneously with the aid of the immersion heater (2), electric band heaters and reheater (11). The flow rate of the effluent during this fixation phase is between 30 and 60 L/h, for example. The effluent is next recovered in the tank for receiving treated effluents (15).

If the radiological analysis (29) does not indicate any trace of contamination, the effluent is then, for example, directly transferred to the industrial evaporator for carrying out the final evaporation or discharged to the environment (28).

In case of contamination, the effluent is then reinjected into the beginning of the method in the tank for receiving contaminated effluents (1).

2) Regeneration: A solution of nitric acid, 1N for example (19) is carried along by the peristaltic pump (16), independently through the desired column, countercurrent (from top to bottom). Of course, because of the high capacity of resins and the very low activity of the effluents to be treated, this is not a very frequent operation.

At the end of regeneration, the resins require reconditioning before beginning a new cycle. The reconditioning is carried out by injection of water, a buffer solution at pH 4.7, then a last rinsing with water by using the same circuit.

In the examples that follow, the role of the temperature and the conditioning pH as well as the nature of the ligand is shown on the capacities of the resins of polyazacycloalkanes grafted on silica.

First, a study is carried out in the static mode, then in the dynamic mode.

EXAMPLE 1

In this example, the capacity of the resins used in the method of the invention to trap uranium is studied in the static mode. This capacity is determined by "batch" experiments with contacting of the sequestering agent in the presence of excess salt under predetermined conditions, especially of pH and temperature.

The operating method of the tests in the static mode is the following.

A known weight (approximately 100 mg) of resin dried under vacuum is placed in a flask containing 10 mL of a solution of 1 g.L-1 of uranyl nitrate at pH 5. The entirety is agitated at a constant temperature for 18 h. Next, the resin is filtered and rinsed with distilled water. The filtrate and the rinsing water are collected and adjusted to 50 mL in a volumetric flask. The concentration of U (VI) is determined by ICP-AES. The amount of fixed U (VI) is calculated relative to the concentration of U (VI) before and after extraction.

Two experiments are carried out for each modified silica.

The total capacity is calculated by considering the amount of uranium extracted, relative to the weight of resin and to the volume of solution through the static partition coefficient Kds.

For each experiment carried out, the static partition coefficient Kds is calculated according to the following formula:

$Kds$=[amount of uranium trapped]/[weight of dry resin]/[amount of uranium remaining in solution]/[volume of the solution]

$Kds=[Co]-[C]/[C] \times V/m$

[Co]=concentration of the solution before extraction (g.mL-1)

[C]=concentration of the solution after extraction (g.mL-1)

V=volume of the solution (mL)

m=weight of the resin (g)

The partition coefficient Kds directly reflects the capacity of the material to fix the metal. This partition coefficient may a priori be infinity, but it is often equal to several hundreds, even sometimes, several thousands.

EXAMPLE 1A

In this example the effect of the temperature on the extraction of uranium VI is studied. The operating method is that described above, but furthermore, the solution is heated during extraction.

Thus, the static partition coefficients obtained for a silica gel of the KIESELGEL® (MERCK®) type are determined, which acts as control and for the Si2323trPr resin (prepared by the "pathway 1" method) according to the temperature, the pH being kept constant at a value of 5.

Figure 3:
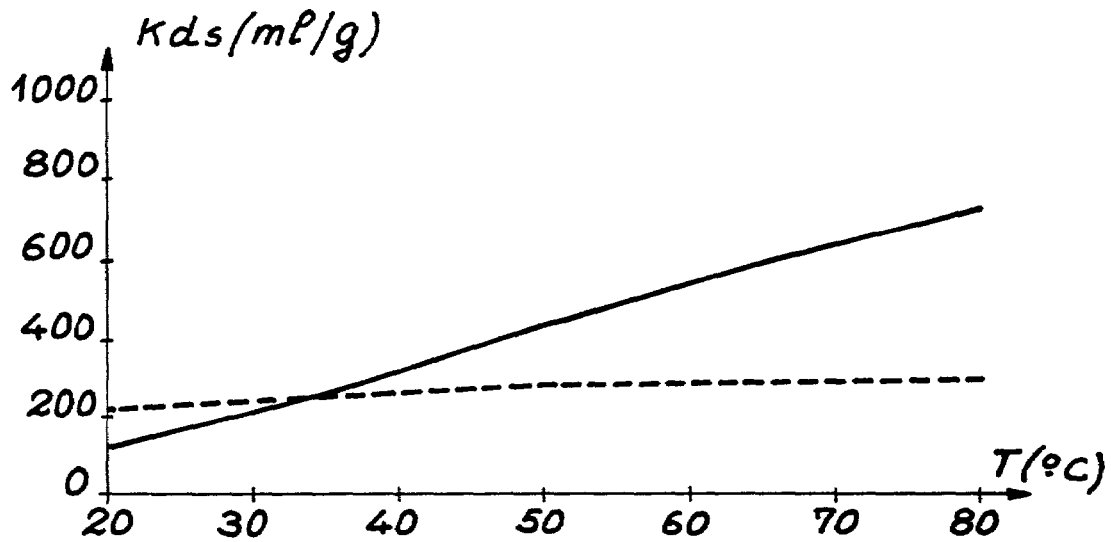
FIG. 3 is a graph that shows the effect of temperature on the extraction of uranium (VI) at a pH of and for a period of 18 h.

The results obtained are brought together in FIG. 3, where the partition coefficient Kds (mL/g) is shown according to T (° C.). The curve with unbroken line is related to the Si2323trPr resin ("pathway 1") and the curve with stippled line is related to the silica gel.

This study shows that for the silica gel, the temperature has practically no influence on the adsorption of the uranium, that is, the kinetics is rapid, while for the modified silica Si2323trPr (obtained by the "pathway 1" method), the increase in temperature causes a considerable increase in the effectiveness of the resin, this result shows that the complexing reaction rate is slow.

The extraction of the U (VI) at 80° C. with this resin, makes it possible to retain, as static, nearly 90% U (VI) (Kds=784).

EXAMPLE 1B

In this example, the influence of the nature of the ligand of the resin on the extraction of uranium VI is studied.

The static partition coefficients of different types of modified, synthesized silicas have been determined according to the operating method described above. The pH being kept equal to 5 and the temperature at 80° C. By way of comparison, under the same conditions the static partition coefficients are determined of a silica gel and the commercial chelating resin AMBERLITE® IRC718 (iminioacetic acid grafted on polystyrene).

The results are brought together in Table II, below:

TABLE II

Static partition coefficient Kds for the different resins studied (pH 5; T = 80° C.; t = 18 h, uncertainty = ±20%)

| Resin | $Kd_s$ |
|---|---|
| AMBERLITE ® IRC718 | 45 |
| Silica gel | 290 |
| Si2222OHtrA | 353 |
| Si2323OHtrA | 303 |
| Si2222OHtrPr | 852 |
| Si2323OHtrPr | 1,078 |
| Si2323trPr ("pathway 1") | 784 |
| Si2323trPr ("pathway 2") | 1,140 |

Because of the high grafted amount of macrocycles, the resin Si2323trPr prepared according to the grafting method, called "pathway 2" has a higher partition coefficient.

The comparison of these results with those obtained under the same conditions with the commercial chelating resin AMBERLITE® IRC718 shows that these new chelating resins are remarkable sequestering agents of uranium (VI).

EXAMPLE 2

In this example, the dynamic exchange capacity of the resins is studied.

In fact, the "static" exchange capacity of the resins is an important parameter, but for a method carried out in the dynamic mode on a column, the "dynamic" exchange capacity is the parameter that really shows the sequestering properties of the resins studied.

The test have been carried out by using the device represented in FIG. 4 which in summary is composed of a column (41) with a diameter of 10 mm and a height of 300 mm, provided with a thermostatting jacket making it possible to control the temperature with the aid of a thermostatted bath (43) and a peristaltic pump (42) to obtain the desired flow rate.

Approximately 12 g of gel are placed in the column (41) after passage into a solution of distilled water. Before each test, the resin is conditioned at different pH values by eluting 500 mL of a buffer solution through the column, than a solution of distilled water to rinse the resin. After this treatment, the column is ready to use.

For the fixation tests, the solution to be purified (44) is eluted on the column from bottom to top (arrow 46) at a flow rate on the order of 100 mL.h-1. The samples to be analyzed are collected (45) every 100 mL and the concentration of U(VI) are determined by ICP-AES. The solution is eluted on the column up to where the leak observed corresponds to the concentration of the parent solution.

The regeneration tests are carried out by eluting 100 mL of a solution of 2N nitric acid at the same flow rate, but from the top to the bottom of the column (arrow 47) immediately after the fixation tests.

Rinsing of the column is next carried out with the aid of a solution of distilled water. The samples to be analyzed are collected every 10 mL and the concentration of U (VI) is determined by ICP-AES.

For each modified silica column, two experiments were carried out.

The "dynamic" exchange capacity depends on a large number of parameters and in particular, on the concentration of the solution to be extracted. In order to obtain the saturation curves that give the variation in concentration of uranium at the outlet of the column (c) according to the volume of solution eluted (V) (see FIG. 5) a concentration of uranium has been chosen that is much higher than those observed in the effluents.

Generally, it is considered that the saturation volume of the column is reached (V1/2) when the outlet concentration is equal to half of the concentration of the parent solution (Co/2).

The measurement of the dynamic mode capacity of the resins according to this procedure has been carried out by calculating the dynamic partition coefficient Kdd for each experiment according to the formula:

$$Kdd = [\text{amount of uranium trapped}]/[\text{weight of dry resin}]/[\text{amount of uranium remaining in solution}]/[\text{volume of the solution}]$$

$$Kdd = [Co] - [C]/[C] \times V/m$$

[Co]=concentration of the solution before extraction (g.mL-1)

[C]=concentration of the solution after extraction (g.mL-1)

V=volume of the solution (mL)

m=weight of the resin (g)

The Kdd is calculated from the saturation curve obtained when C=Co/2:

$$Kdd = V1/2/m$$

It is appropriate to mention that the saturation curve also makes it possible to calculate the weight of uranium retained, which is approximately equal to V1/2×So.

For these experiments, the resins chosen to be tested are Si2323trPr synthesized according to pathways 1 and 2. The silica was systematically chosen as control material.

EXAMPLE 2A

In this example, the influence of the pH for conditioning the resins on the extraction of the uranium (VI) has been studied with the aid of resins used in the method of the invention and with the aid of a control silica gel. The operating method is that given above.

The extraction of the uranium is studied specifically on the resin Si2323trPr (prepared by the "pathway 1" method) for a range of pH values of buffer solutions for conditioning from 2 to 9 (2.5; 4; 5; 7 and 9), the temperature being constant and equal to 25° C.

The results are brought together in Table III.

TABLE III

Dynamic partition coefficient for the Si2323trPr resin,
according to the pH (T = 25° C., uncertainty = ±10%)

| PH | Kdd Si2323trPr ("pathway 1") | Silica gel |
|---|---|---|
| 2.5 | 5 | 5 |
| 4 | 2.6 | 156 |
| 5 | 3 | 112 |
| 7 | 3 | 67 |
| 9 | 6 | 3 |

The results obtained that are reported in FIG. 6 enable the experimental determination of the optimum pH which is between pH 4 and pH 5. This result is in good agreement with the thermodynamic study of this new class of ligands.

Moreover, it is surprising to note the very low capacity of the silica in the dynamic mode relative to what has been observed in the static mode. Since the trapping mode of the silica is essentially being carried out by simple physical adsorption, it may be assumed that in the dynamic mode, the elution of the solution carries along the adsorbed uranium.

EXAMPLE 2B

According to the invention, in order to accelerate the complexing rate with resins used, it is necessary to work at a high temperature throughout the method.

In this example, therefore, the influence of the temperature on the dynamic partition coefficient is studied at the same time on the silica (control) and on the Si2323trPr resins ("pathway 1") and Si2323trPr ("pathway 2"). The operating method is that described above, the conditioning pH being kept constant and equal to 4 for the Si2323Pr resin and 9 for the silica. The results obtained are brought together in Table IV and reported in FIG. 7.

TABLE IV

Dynamic partition coefficient for silica (pH 9) and
Si2323trPr (pH 4) according to the temperature
(uncertainties = ±10%)

| | Kdd (1) | | |
|---|---|---|---|
| T (° C.) | Silica gel | Si2323trPr ("pathway 1") | Si2323trPr ("pathway 2") |
| 25 | 6 | 158 | 182 |
| 50 | 6 | 202 | 266 |
| 80 | 8 | 242 | 324 |

It is noted that keeping the column at 80° C. makes it possible to increase considerably and surprisingly the effectiveness of the resins used according to the invention and that the increase is between 50% and 70% according to the cases.

In the best cases, that is, for the use of the Si2323trPr resin ("pathway 2") the observed Kdd (324) corresponds to the fixation of 0.33 mmol of uranium per gram of resin (79 mg of uranium per gram of resin).

As has been mentioned previously, the simple use of columns filled with silica, whatever are the conditions of use, leads to very mediocre results.

This study in the dynamic mode clearly shows that the incomparably better results in terms of effectiveness of extraction, represented by the capacity, are obtained in the specific ranges of conditioning pH and temperature of the method according to the invention. The tests demonstrate that the method according to the invention make it possible to reach a decontamination of α-contaminated effluents that has never been obtained by the methods of the prior art.

In Table V, the amount of fixed U (mmol.g) is given according to the conditions of the method.

TABLE V

| Amount of fixed U (mol.g) | Conditions of the method |
|---|---|
| 0.33 | Si2323 ("pathway 2"), conditioning at pH 4, T = 80° C. |
| 0.24 | Si2323trPr ("pathway 1"), conditioning at pH 4, T = 80° C. |
| 0.16 | Si2323trPr ("pathway 1"), conditioning at pH 4 |
| 0.01 | Si2323trPr ("pathway 1"), without conditioning |

The best capacity is obtained for the use of the Si2323trPr, resin ("pathway 2") at 80° C. and after conditioning at pH 4.

EXAMPLE 3

This example concerns regeneration tests in dynamic mode of resins used in the method according to the invention.

These tests were carried out according to the optimum conditions for use after having saturated by uranium a column loaded with Si2323trPr resin ("pathway 2"). After saturation, a solution of 2N nitric acid is eluted at the same flow rate, but from top to bottom of the column at ambient temperature.

The elution profiles (concentration of uranium (VI) according to the volume of HNO3 eluted) obtained for each experiment make it possible to calculate the amount of uranium salted out and therefore the level of regeneration:

Level of regeneration=amount of uranium salted out/
amount of uranium fixed×100

By way of example, the type elution profile (FIG. 8) presents an elution peak for a concentration of uranium reaching 80 times that of the parent solution. The level of regeneration calculated is near 100% with few uncertainties. Therefore, it may be considered that the recovery of uranium is quantitative.

A study carried out on several consecutive extraction/regeneration cycles (FIG. 9) shows that all the cases of salting out of uranium are total and the regeneration of the material total.

EXAMPLE 4

In this example, the treatment of real effluents from the CEA centre at VALDUC is carried out by a pilot installation according to the invention comprising two columns. This installation is approximately similar to that of FIG. 1 and its operation is also that described above. This pilot installation is used for carrying out the last decontamination, that is, a treatment upstream of the industrial evaporator.

We are specifying below the characteristics of the pilot installation and the operating conditions used. These are approximately the optimum conditions for use of the resins previously defined in the dynamic mode.

The installation includes a first column filled with silica (12 liters) and a second column filled with Si2323trPr resin.

The tank for receiving the contaminated effluents has a volume of 1.5 m3; the effluent before being received passes through a filtering bowl provided with three cartridges (filtration diameter 5 μm).

The tank for receiving the treated effluents also has a volume of 1.5 m3.

The entire installation is placed in a retention container of 3 m3.

The temperature of the effluent during passage through the column of Si2323trPr resin is 60° C.

The flow rate of the effluent during the fixation phase is 30 to 60 L/h. The regeneration is carried out with a 1N nitric acid solution at the end of which the resins are reconditioned by a buffer solution at pH 4.7.

The results of the tests especially with the activities before and after treatment by the device of the invention are brought together in Table VI.

TABLE VI

Effluents treated with the pilot installation according to the invention

| Effluent No. | 1 | 2 | | 3 | |
| --- | --- | --- | --- | --- | --- |
| Volume (m3) | 16 | 18 | | 12 | |
| Saline load (mg/l) | 0.06 | 0.02 | | 0.02 | |
| Radioelements present | U | Am | U | Pu | Am |
| Activity before treatment (Bq/m3) | 180 | 16 | 320 | 36 | 531 |
| Activity after treatment (Bq/m3) | <LD* | <LD* | <LD* | <LD* | <LD* |

*The limits of detection (LD) are between 1.5 and 2.5 Bq/m3.

Effluent 1 originated from the accidental drainage of rainwater through a building. This effluent which has not undergone any prior treatment containing, moreover, sludge, algae, leaves.

Effluent 2 was an effluent that could not be decontaminated finally by the current installation for treatment of effluents using evaporation and microfiltration and corresponding to the prior art.

In fact, as we have already pointed out, this latter does not make it possible to decontaminate finally all types of effluent. The treatment of this effluent has been made possible by the installation of the invention ensuring zero activity.

Effluent 3 was an effluent with very low activity which had not undergone any particular prior treatment such as a chemical treatment or evaporation. The effluents possessing this type of activity form a large part of the effluents from the centre, such as that of VALDUC, in addition, the direct treatment of this type of effluent by the method according to the invention forms a very worthwhile alternative which may be integrated within the current installation for treatment of effluents. This type of treatment especially makes it possible to avoid the evaporation step which is much more awkward to use.

The diversity of effluents treated shows that the installation according to the invention is capable of carrying out the recovery of traces of actinides of all types of effluents with very low activity produced by the VALDUC centre.

This is the important advantage compared with the current method and installation which finally does not allow decontamination of all types of effluents.

The high volumes that have been treated by the pilot installation of the invention are significant and with them make it possible to demonstrate the superiority with respect to the ultrafiltration installation, currently used to carry out the final treatment upstream of the evaporation tower, as much in terms of effectiveness and expenses of investment, operating and maintenance.

EXAMPLE 5

Installation

In this example, at the laboratory stage in glove box, various tests carried out to treat the effluents upstream of the industrial evaporator, with the aid of an installation according to the invention.

Figure 2:
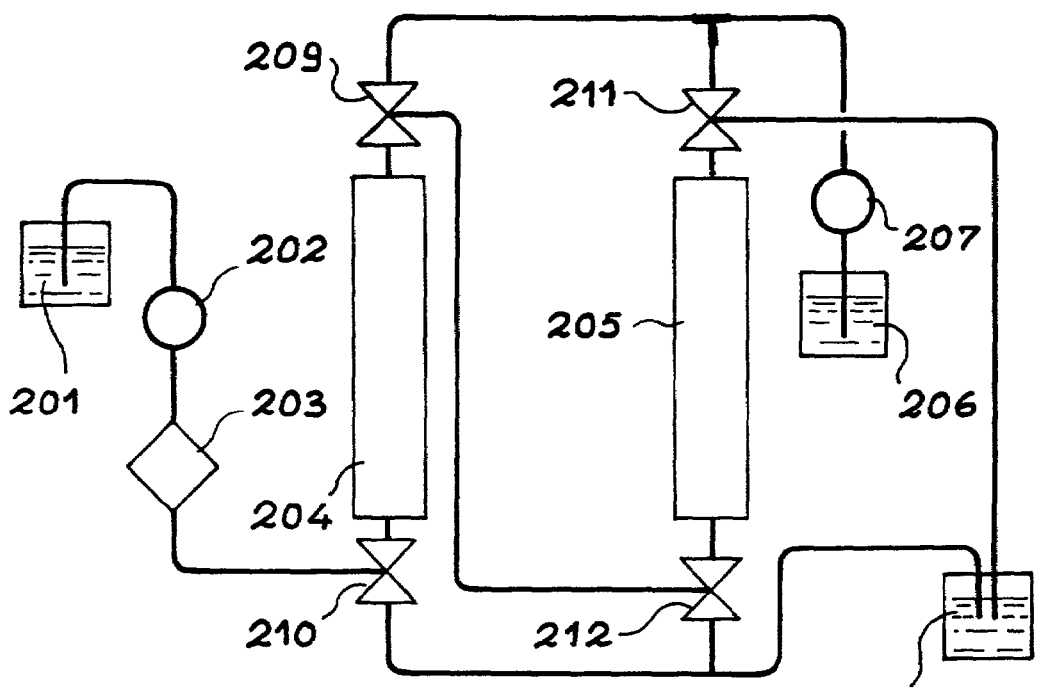
FIG. 2 is a diagrammatic view in vertical section of an installation for use of the method according to the invention at the laboratory stage, more particularly suiting treatment of effluents upstream of the industrial evaporator.

This installation which is comparable to that of FIG. 1, is however slightly modified, it is described in FIG. 2.

Within the glove box, the experimental installation conforms to the present invention and is principally composed of the following parts:

a capacity (201) which directly receives the effluents from the treatment station of the VALDUC centre, a peristaltic positive displacement vacuum pump (202), a filtration capsule (203) with a pore diameter of 50 μm;

two resin columns mounted in series: a first column (204) filled with silica (silica gel) or a resin of the polyacrylate type (AMBERLITE® IRC86RF) and a second column (205) filled with silica (silica gel) modified by polyazacycloalkanes, preferably, it is a resin called Si2323trPr which has been prepared either by the method called "pathway 1" or by the method called "pathway 2". Each column has a diameter of 1 cm and a height of 30 cm.

Each column contains 12 g of silica gel or resin;

a circulation thermostat for keeping the temperature of the columns at 60° C.;

a tank (206) filled with 1N HNO3, distilled water or buffer solution, connected to a peristaltic positive displacement vacuum pump for carrying out, respectively, the regeneration and the conditioning of the resins in each of the columns (204, 205);

a tank for recovery of the eluates from the columns (208);

three-way valves (209, 210, 211, 212) at the inlet and outlet of the columns.

Effluents Treated

The effluent sampled to carry out this study has a total radiological activity of approximately 6.1 kBq/m3 (Table VII) and a saline load of 0.78 mg/L. It has not undergone any prior chemical treatment such as precipitation or flocculation. The panoramic analysis (Table IX) of this effluent shows that the actinides only represent a tiny part of the elements present (<1 ppm). This effluent contains in the great majority alkali and alkaline-earth elements (99.29%), principally Na (84.38%), Ca (11.01%), K (3.44%) and Mg (0.45%). This effluent also contains B (0.59%) and several metal elements (Ti, Ni, W, Al and Zn; for a total of 0.15%).

TABLE VII

Activity and concentration of the sampled effluent (±20%)

| | U | Pu | Am |
| --- | --- | --- | --- |
| Activity (kBq/m3) | 4.7 | 0.54 | 0.83 |
| Concentration | 185 ppb | 0.24 ppt | 6 ppq |

Procedure

Just like the operating of the installation and the pilot installation according to the invention previously presented, the operating of the experimental installation may be broken down into two phases:

Fixation

The effluents originating directly from the VALDUC treatment station of effluents are introduced into the glove box where they are discharged into the capacity (201) then taken back by the pump (203).

After passage on the filter (203) making it possible to be rid of impurities (dust, particles etc.), the solution crosses through the resin bed of each from the bottom to the top. The first column (204) as has already been seen, filled with silica or a resin of the polyacrylate type (AMBERLITE® IRC86F) and the second column (205) filled with silica modified with macrocycles. These latter are poured at the head of the column and are recovered in the capacity (208) where regular samples are taken to be analyzed by α spectrometry or ICP-MS.

Regeneration

The regeneration of the resins is carried out by elution of 2N nitric acid from the top to the bottom of the column. The eluates are recovered in the capacity (208) where regular samples are taken for analyses. The resins then require a reconditioning before beginning a new cycle. The latter is carried out by elution of water, then a buffer solution at pH 4.7 always from the top to the bottom of the column.

Combination of Resins Used

The three combinations of the following resins have been proposed (Table VIII)

TABLE VIII

| Combination | 1st column | 2nd column |
|---|---|---|
| (a) | Silica | Si2323trPr ("pathway 1") |
| (b) | Silica | Si2323trPr ("pathway 2") |
| (c) | AMBERLITE ® IRC86RF | Si2323trPr ("pathway 2") |

Result and Discussion

The results of the tests carried out are brought together in Table IX.

The elution profiles observed show that the effluents are totally decontaminated for a volume less than the leakage volume of radioelements (v=approximately 1 L). Panoramic analyses were carried out just before this leakage volume, in order to evaluate the selectivity of the method (see Table IX).

TABLE IX

Panoramic analysis carried out after elution of a liter of effluent 1
(before the leakage volume)

| Family of elements | Element | Starting effluent C (ppb) | Level | After passing SiO2 + Si2323trPr (pathway 1) C (ppb) | Level of purification | After passing SiO2 + Si2323trPr (pathway 2) C (ppb) | Level of purification | After passing AMBERLITE IRC86 + Si2323trPr (pathway 2) C (ppb) | Level of purification |
|---|---|---|---|---|---|---|---|---|---|
| Alkali/ alkaline earth | Na | 330,000 | 84.38% | 300,000 | 9% | 307,000 | 7% | 260,000 | 21% |
| | K | 23,000 | 3.44% | 21,000 | 9% | 23,000 | 0% | 16,000 | 30% |
| | Ca | 75,000 | 11.01% | 65,000 | 13% | 75,000 | 0% | <5,000 | >87% |
| | Mg | 1,980 | 0.45% | 1,770 | 11% | 1,920 | 3% | 170 | 91% |
| | Sr | 84 | 59 ppm | 68 | 19% | 81 | 3% | <50 | >40% |
| | Ba | 240 | 100 ppm | 220 | 8% | 275 | 0% | <50 | >79% |
| | Ll, Be, Cs | <50 | | <50 | | <50 | | <50 | |
| Transition metals | Ti | 240 | 300 ppm | 210 | 12% | 230 | 4% | <50 | >75% |
| | Ni | 370 | 450 ppm | 350 | 5% | 370 | 0% | 240 | 35% |
| | W | 50 | 18 ppm | 45 | 10% | 48 | 4% | <20 | >60% |
| | Fe, V, Cr, Mn, Co, Mo, Ag | <50 | | <50 | | <50 | | <50 | |
| Zn family | Al | 100 | 200 ppm | 50 | 50% | 50 | 50% | <50 | >50% |
| Heavy metals | Zn | 514 | 500 ppm | 327 | 36% | 319 | 38% | 320 | 38% |
| | Ga, As, Cd, Sn, Pb | <50 | | <50 | | <50 | | <50 | |
| Other elements | B | 1,130 | 0.59% | 960 | 15% | 960 | 15% | 950 | 16% |
| | Th | <50 | | <50 | | <50 | | <50 | |

1 Uncertainty on the analyses: ±10%; uncertainty on the levels: ±20%.

Considering these results:

The alkalis and alkaline-earths are retained very little by systems (a) and (b), the levels of purification oscillating between 8 and 19% for (a) and between 0 and 7% for (b). The selectivity of the resins Si2323trPr is therefore high for this family of elements and it increases appreciably when going from a resin elaborated by the "pathway 1" to a resin elaborated by "pathway 2".

If the first column contains AMBERLITE® IRC86F resin (c), the effluent is found almost totally purified of alkaline-earth elements (Ca, Mg, Sr and Ba) but on the other hand, the levels of purification are only 21 and 30% for the alkali elements Na and K, respectively.

The transition metals are also retained very little by the systems (a) and (b), the levels of purification oscillate between 5 and 12% for (a) and between 0 and 4% for (b). The selectivity of the resins Si2323trPr is therefore high for this family of elements and once again, it seems to increase appreciably when passing from a resin elaborated by pathway 1 to a resin elaborated by pathway 2.

If the first column contains AMBERLITE® IRC86F resin (c), the effluent is found to be almost totally purified of Ti and W, but on the other hand, the level of purification is only 35% for Ni.

Zn and Al are moderately retained on the different columns; the levels of purification are on the order of 40% in all cases.

Finally, B is slightly retained, with identical levels of purification, on the order of 15%.

These experiments show that these resins have very good selectivity, particularly with respect to alkalis, alkaline-earths, and transition metals. The selectivity is even more marked for the resin Si2323trPr elaborated according to "pathway 2" compared with the resin Si2323trPr, elaborated according to "pathway 1". Moreover, the coupling of these resins with the AMBERLITE® IRC86F resin makes it possible to purify a good part of the alkaline-earths and transition metals.

In spite of this high selectivity, the high salinity of the effluents (essentially in alkalis and alkaline-earths) held at this level of the treatment cycle rapidly contributes to saturating the resins.

Thus, for metals in the actinide series, these experiments show that it is possible to directly treat effluents having this level of activity, in spite of rather low leakage volumes observed (between 50 and 70 column volumes), attributable to this high salt effect (the actinides only represent a ppm fraction of all the elements). This study shows that the effectiveness of such a method of treatment of radioactive elements depends less on the level of activity of the effluent than on its saline load.

The invention claimed is:

1. A method for removing one or more metal cations contained in a liquid, comprising:
   contacting the liquid at a temperature higher than or equal to 60° C., with a chelating ion exchange resin formed from polyazacycloalkane grafted on a solid support to chelate the metal cations on the resin, and
   conditioning the resin at a pH of 4 to 6 prior to said contacting.

2. The method according to claim 1 in which the contacting is carried out at a temperature of 60 to 80° C.

3. The method according to claim 1 in which the conditioning is carried out at a pH of 4 to 5.

4. The method according to claim 1 in which the conditioning is carried out by contacting said resin with a buffer solution, in which the pH is 4 to 6, wherein the conditioning may be preceded, followed or both preceded and followed, by a rinsing of the resin with a major solvent of the liquid.

5. The method according to claim 4, wherein the conditioning of said resin is carried out by contacting said resin with an aqueous buffer solution and the major solvent is distilled water.

6. The method according to claim 1 which is carried out continuously,
   wherein said resin is present in at least one column,
   and wherein the contacting is carried out by passing a current of the liquid through the column.

7. The method according to claim 1, further comprising regenerating the resin after the resin is saturated with chelated metal cations.

8. The method according to claim 7, further comprising:
   regenerating the resin by passing a regeneration solution through at least one column in which the resin is present, in a reverse direction from the passing of the liquid.

9. The method according to claim 8 in which said regeneration solution is one or more acid solutions.

10. The method according to claim 9, wherein one or more of the acid solutions is a nitric acid solution.

11. The method according to claim 8, further comprising: treating the regeneration solution after the regenerating to recover the metal cations.

12. The method according to claim 7, further comprising:
   regenerating the resin by passing a regeneration solution through at least one column comprising the resin in a reverse direction from the direction of the passing of the liquid.

13. The method according to claim 1, further comprising:
   treating the liquid prior to the contacting, with an ion exchanger or organic or mineral adsorbent grafted on a support, wherein the adsorbent or ion exchanger is different from said polyazacycloalkane resin.

14. The method according to claim 13, wherein the treating is carried out with an adsorbent and said adsorbent is one or more silica gels.

15. The method according to claim 13, wherein the treating is carried out with an ion exchanger and said ion exchanger is a polyacrylate resin.

16. The method according to claim 13 in which said treating is carried out continuously,
   wherein said ion exchanger or adsorbent is present in at least one column and the treating is carried out by passing a current of the liquid through at least one column positioned upstream of a column filled with the resin.

17. The method according to claim 16 in which said metal cations are one or more cations selected from the group consisting of cations of U, Pu, Am, Ce, Eu, Al, Gd, Cr, Mn, Fe, Co, Ni, Cu, Zn, Ag, Cd, B, Au, Hg, Pb, As, Ca, Sr, Mg, Be, Ba and Ra.

18. The method according to claim 17 in which the liquid is a biological fluid and the metal cations removed are copper and aluminium.

19. The method according to claim 18, wherein the biological fluid is blood.

20. The method according to claim 13, further comprising:
   regenerating the resin saturated with chelated metal cations with a regeneration solution, and
   regenerating said ion exchanger or adsorbent when it is saturated with chelated metal cations,
   wherein the regeneration of the resin and the ion exchanger or adsorbent is carried out under the same conditions and at the same time and with the same regeneration solution.

21. The method according to claim 1 in which said metal cations are one or more metal cations selected from the group consisting of transition metals, heavy metals, metals from group IIIA of the periodic table, lanthanides, actinides and alkaline-earth metals.

22. The method according to claim 1 in which the liquid is an aqueous liquid.

23. The method according to claim 22, wherein the liquid is a biological fluid and the metal cations removed are copper and aluminum.

24. The method according to claim 23, wherein the biological fluid is blood.

25. The method according to claim 1 in which the liquid is a radioactive aqueous effluent with low activity.

26. The method according to claim 25 in which said radioactive aqueous effluent is an aqueous effluent with low activity originating from an industrial evaporator of a treatment installation of effluents from a nuclear installation.

27. The method according to claim 1 in which said chelating ion exchange resin formed from polyazacycloalkane grafted on a solid support fulfills one of the three formulas (I), (II) and (III) below:

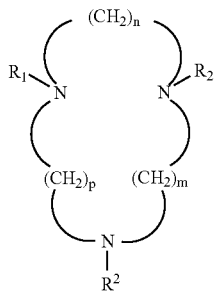
(I)

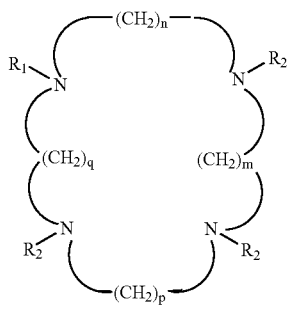
(II)

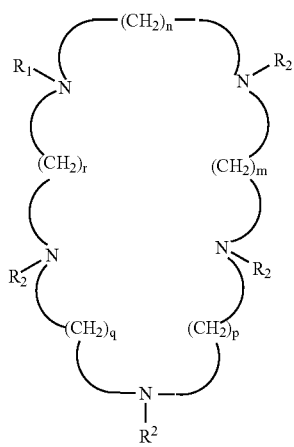
(III)

in which n, m, p, q, r which may the same or different are equal to 2 or 3, R1 is a solid support, R2 represents the hydrogen atom or the (CH2)2-R3 group, R3 being a functional group chosen from the group formed by COOH, CONH2, CH2OH, CN or COOR4, R4 representing an alkyl or benzyl group, or R2 represents the —(CH2)-R5 group, R5 representing COOH or PO3R6, R6 representing an alkyl group or hydrogen.

28. The method according to claim 27 in which R1 is a solid support of formula:

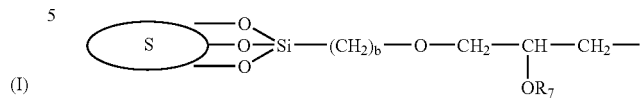

or

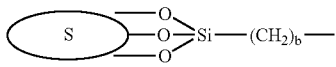

wherein S represents a silica gel, b is between 1 and 4 and R7 is an alkyl group or a hydrogen atom.

29. The method according to claim 28 in which a grain size distribution of the solid support is between 20 and 400 mesh.

30. The method according to claim 29, wherein the grain size distribution of the solid support is between 20 and 70 mesh.

31. The method according to claim 28, wherein b is equal to 3.

32. The method according to claim 27 in which said resin is at least one selected from the group consisting of:

Si2222trA

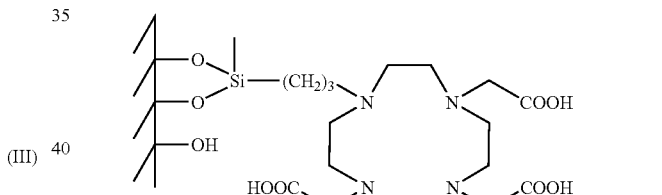

Si2323trA

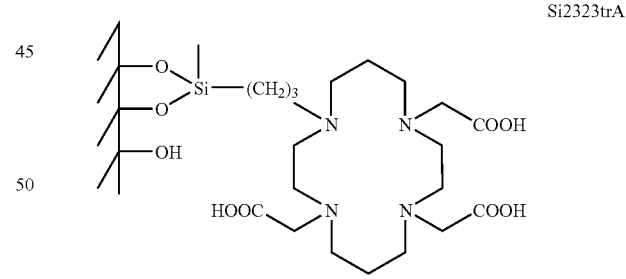

Si2222trPr

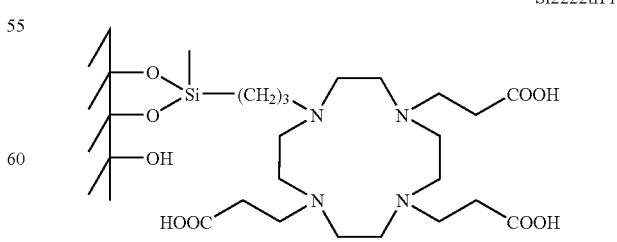

Si2222trPr

-continued

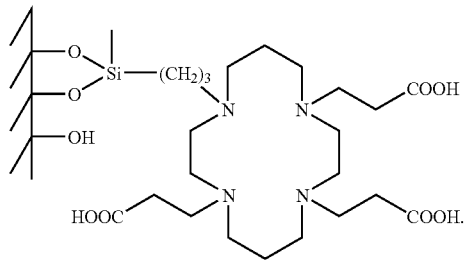

Si2323trPr

33. The method according to claim 1 in which the solid support is an organic polymer that may or may not be crosslinked.

34. The method according to claim 1 in which the solid support is a residue of an organic polymer that may or may not be crosslinked with an alkyl halide.

35. The method according to claim 34 in which the solid support is a residue of chloromethyl polystyrene.

36. The method according to claim 35 in which a grain size distribution of said chloromethyl polystyrene is between 20 and 400 mesh.

37. The method according to claim 36, wherein the grain size distribution of said chloromethylpolystyrene is between 20 and 70 mesh.

38. The method according to claim 34, wherein the alkyl halide is an alkyl chloride.

39. The method according to claim 1 in which said solid support is silica, and said resin is prepared by a method in which silica is reacted with a spacer arm, then with azacycloalkane and then the substitution of the free amine functions of the polyazacycloalkane is carried out.

40. The method according to claim 39, wherein the substitution of the free amine functions is carried out by a carboxylic function group.

41. The method according to claim 1 in which said solid support is silica and said resin is prepared by a method in which first, an unsubstituted polyazacycloalkane is reacted with a spacer arm, then said polyazacycloalkane carrying a spacer arm is grafted on the silica.

42. The method according to claim 41 further comprising functionalizing said polyazacycloalkane carrying a spacer arm prior to its grafting on the silica.

43. The method according to claim 41 in which the amount of polyazacycloalkane grafted per unit weight of solid support is greater than 0.4 mmol/g.

44. The method according to claim 41, wherein the polyazacycloalkane is at least one of a cyclam and a cyclene.

* * * * *

UNITED STATES PATENT AND TRADEMARK OFFICE
CERTIFICATE OF CORRECTION

| | |
|---|---|
| PATENT NO. | : 7,083,732 B1 |
| APPLICATION NO. | : 10/069565 |
| DATED | : August 1, 2006 |
| INVENTOR(S) | : Chollet et al. |

It is certified that error appears in the above-identified patent and that said Letters Patent is hereby corrected as shown below:

On the title page, Item (75), the 2$^{nd}$ Inventor's Name is incorrect. Item (75) should read:
-- (75) Inventors:  Herve Chollet, Dijon (FR);
    Jean-Louis Babouhot, Fontaine les Dijon (FR);
    Frederic Barbette, Vaux sous Aubigny (FR);
    Roger Guilard, Fontaine les Dijon (FR) --

Signed and Sealed this

Twenty-first Day of November, 2006

JON W. DUDAS
*Director of the United States Patent and Trademark Office*